June 20, 1967   J. P. HENRY ET AL   3,326,996
DEHYDROGENATION OF ETHYLBENZENE TO STYRENE
Filed May 6, 1964
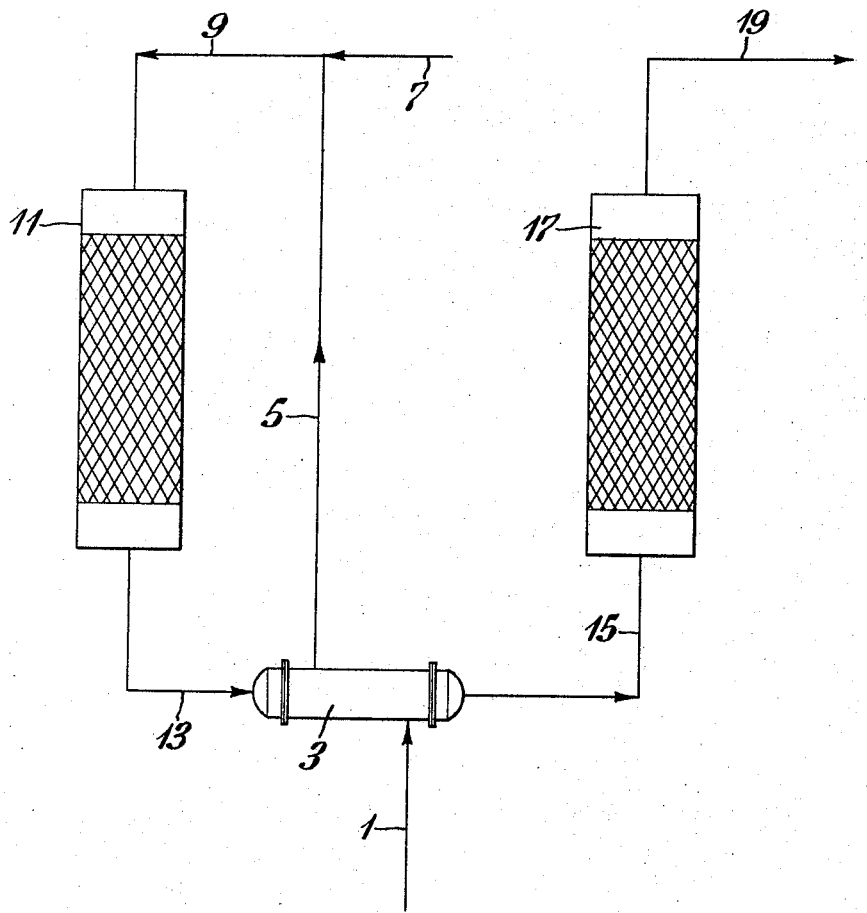
INVENTORS
JOSEPH P. HENRY
LOY A. WILKINSON
ATTORNEY

United States Patent Office 3,326,996
Patented June 20, 1967

3,326,996
DEHYDROGENATION OF ETHYLBENZENE TO STYRENE
Joseph P. Henry and Loy A. Wilkinson, Charleston, W. Va., assignors to Union Carbide Corporation, a corporation of New York
Filed May 6, 1964, Ser. No. 365,350
6 Claims. (Cl. 260—669)

The present invention relates to an improved method for the dehydrogenation of alkylated aromatic hydrocarbons and is particularly related to the dehydrogenation of ethylbenzene to styrene whereby the conversion of styrene is greatly increased.

The dehydrogenation of ethylbenzene to styrene is a well known process to which the art has given considerable amount of attention. The conventional method has heretofore been to evaporate the ethylbenzene and mix it with steam, in the proper proportion, and then pass the mixture through a catalyst bed disposed in a reactor wherein the dehydrogenation to styrene takes place. It has also been long recognized that this dehydrogenation reaction is highly endothermic. Therefore, the reaction is accompanied by a considerable drop in temperature in the reactor, which temperature drop limits the conversion of ethylbenzene to styrene by this process.

Various solutions have heretofore been proposed in an attempt to increase the conversion to styrene when dehydrogenating ethylbenzene. Some of these solutions have been directed to changing the composition of the catalyst in the conventional single-stage reactors. However, despite recent advances in the catalysts the conversion to styrene in a single adiabatic reactor has heretofore been limited to about 38% at high efficiencies. Other proposed methods contemplate the addition of superheated steam to the vaporized ethylbenzene feed prior to entering the reactor, or increasing the quantity of steam which is used. The use of superheated steam, however, is disadvantageous in that it results in cracking of the hydrocarbon feed to undesirable products. Increasing the quantity of steam, on the other hand, dilutes the reaction mixture and therefore limits the capacity of the system.

Recently, the art has restored to the use of multistage reactors with interstage heating in an effort to compensate for the temperature drop resulting from the endothermic nature of the reaction. Thus, heat energy is added to the effluent from the first reactor prior to its introduction into the next reaction chamber. This heat energy has heretofore been added to the first reactor effluent by either passing said effluent through a furnace or by the injection of steam directly into the effluent stream before entering the next reaction stage. The use of a furnace has the obvious disadvantage of exposing the hydrocarbons to open flame which creates explosion or fire hazards created by partial or total failure of the furnace tubes at the operating temperatures and pressures. The injection of steam directly into the reactor effluent is undesirable from at least two standpoints. First, the addition of superheated steam in this manner could result in cracking of part of the hydrocarbon stream into undesirable side products. Second, and more important, is that the injection of steam in this manner limits the quantity of steam which must be mixed with the feed prior to entering the first reaction stage or, if sufficient steam is added to the first reaction stage, limited quantities of steam will be available for interstage heating. Generally, the economics of the process limits the total quantity of steam which must be used in this process to about 20 moles of steam per mole ethylbenzene fed to the system. If a low quantity of steam is used in the first reaction stage, the catalyst activity will be greatly reduced.

On the other hand, if the necessary amount of steam is mixed with the ethylbenzene to be fed to the first reactor effluent (usually 14–15 moles) then very little steam would be available for injection to the effluent from the first reactor, thus failing to accomplish the desired degree of heating. It can also be appreciated that this limitation is more pronounced when more than 2 reaction stages are employed.

It is therefore an object of this invention to provide a novel method of dehydrogenation of ethylbenzene to styrene whereby the foregoing disadvantages are obviated. It is also an object of this invention to increase the conversion to styrene to as high as about 55 to 60% as compared to conversions of about 38% which have heretofore been attained in single-stage reactors at the same efficiencies.

According to this invention the dehydrogenation of ethylbenzene to styrene is effected in a plurality of reaction zones with interstage heating. Vaporized ethylbenzene is introduced to the first reaction zone containing a dehydrogenating catalyst, along with the entire quantity of steam which is used in the process. The steam, which may have been superheated separately, is employed to raise the temperature of the effluent from the first reaction zone by indirect heat exchange therewith. The indirect heat exchange between the steam and the reactor effluent is accomplished in a heat exchanger, preferably of the shell and tube design, and the very same steam which is used to raise the temperature of the reactor effluent, after leaving the heat exchanger is mixed with the ethylbenzene feed to the first reaction zone. Thus, the temperature of the effluent from the first reaction zone can be raised to the temperature of the feed to the first reaction zone, or even higher. No splitting of the steam is necessary, nor is there any danger of explosion which is otherwise associated with the passing of hydrocarbons through fired heaters and furnaces.

It has further been discovered that type 304 stainless steel can be employed as a material of construction for the design of the heat exchanger and the interconnecting piping which are employed herein to accomplish the interstage heating. It has heretofore been believed that type 304 stainless steel is unsuitable as a material of construction when in contact with ethylbenzene at the conditions which generally prevail in this process, presumably because of its catalyzing effect upon ethylbenzene. Type 304 stainless steel is a material of construction with which the art is thoroughly familiar and is the standard designation employed by the American Iron and Steel Institute for stainless steel having the following composition; all percents are by weight:

| | Percent |
|---|---|
| Carbon (maximum) | 0.08 |
| Manganese | 2.00 |
| Silicon (maximum) | 1.00 |
| Chromium | 18.00–20.00 |
| Nickel | 8.00–12.00 |
| Iron | Remainder |

Type 304 stainless steel (a nickel-containing alloy) is superior to other alloys which do not contain nickel in that the former withstands temperature changes in the interstage heater without undergoing any metallurgical deformation. Non-nickel containing alloys, however, tend to undergo metallurgical changes resulting from substantial temperature changes. For example, when a non-nickel alloy is employed as a material of construction for the present interstage heater, the temperature changes resulting from the cooling of the heat exchanger (which is usually at 750–800° C.) results in severe embrittlement of the alloy making it unreliable for this purpose. No such difficulties are encountered when using type 304 stainless steel as the material of construction for the interstage heater.

The present invention is more clearly understood with reference to the accompanying drawing which is a schematic flow diagram of one illustrative embodiment of the novel process. In the drawing, steam which may have previously been superheated, is introduced via conduit 1 to heat exchanger 3 at the shell side thereof. After heat exchange with the effluent from the first reaction zone said steam leaves the heat exchanger via conduit 5 and is mixed with the ethylbenzene feed flowing through conduit 7. The mixture of ethylbenzene and steam is then introduced via conduit 9 into catalytic reaction zone 11. The effluent from reaction zone 11 is introduced via conduit 13 into heat exchanger 3 and leaves said heat exchanger via conduit 15 and enters reaction zone 17. The final product mixture leaves reaction zone 17 via conduit 19 and is introduced into a product recovering system (not shown) in order to recover styrene from admixture with other reaction products.

The dehydrogenation of ethylbenzene to styrene is thus partially effected in each reaction zone and the effluent from the first reaction zone is thus heated by steam to raise the temperature of the effluent of the first reaction zone to the desirable level. While the drawing illustrates the use of two reactors to effect the novel process, it is obvious, of course, that a plurality of reaction zones can be employed and provisions made for heating-between stages. Furthermore, the interstage heater is not limited to shell-and-tube type heat exchanger shown in the drawing. Other types of heat exchangers such as floating head, return bend, fin tubes types of heat exchangers are equally efficacious so long as the exchange of heat is by indirect mechanism.

The inlet temperature of ethylebenze-steam mixture to the first reaction zone ranges from about 580° C. to about 650° C. and the temperature of the effluent from the first reaction zone ranges from about 580° C. to about 610° C. The entering and exit temperatures of the hydrocarbon-steam mixture in the succeeding reaction zones is about the same as those in the first reaction zone. The quantity of steam which is employed in this process varies depending on the alkylated aromatic hydrocarbon which is fed to the reactor. In the dehydrogenation of ethylbenzene to styrene, the quantity of steam varies from about 12 to about 20 moles of steam per mole of ethylbenzene fed to the first reaction zone, preferably from about 15 to about 18 moles of steam per mole of ethylbenzene. It is to be observed that an important feature of this process is that the very steam which is used to raise the temperature of the effluent from the first reaction zone is injected to and mixed with the ethylbenzene feed. The temperature of the steam entering the heat exchanger is not narrowly critical and may be so selected as to effect the desired degree of temperature rise of the effluent from the first reaction zone. The quantity of the steam entering the heat exchanger can be approximately the same as the quantity of the steam injected into the ethylbenzene fed to the first reaction zone.

The effluent from the first reaction zone containing styrene, ethylbenzene and steam may be reheated to the temperature of the ethylbenzene steam mixture entering the first reaction zone, or to a higher or lower temperature.

The reactor dimensions and its geometry are not narrowly critical in this invention. A plurality of reaction zones can be employed to effect the novel process but it is of course obvious that the number of the reaction zones is limited by the economy of the process. It is preferable to employ two reactions zones to achieve the desired degree of conversion of ethylbenzene to styrene by the novel process.

The catalyst which must be employed in the process of this invention is any well-known dehydrogenation catalyst such as ferric oxide-potassium oxide, magnesium oxide-ferrous oxide-potassium carbonate, alumina-silica-nickel, or any other catalyst which was heretofore used for dehydrogenation of ethylbenzene to styrene.

The novel process of this invention may encompass the dehydrogenation of alkylated aromatic hydrocarbons other than styrene, such as for example, isopropylbenzene, diethylbenzene, ethylchlorobenzene, etc. to produce vinyl substituted aromatic hydrocarbons.

An example of producing styrene from ethylbenzene according to the process of this invention is described in connection with the accompanying drawing. This example merely serves to illustrate the conditions employed in one illustrative embodiment of this invention.

EXAMPLE

One hundred and six pounds per hour of vaporized ethylbenzene at 540° C. was mixed with 324 lbs. per hour steam at a temperature of 652° C. and the mixture was introduced into the first reactor at a temperature of 620° C. The ethylbenzene is partially dehydrogenated to styrene upon contact with a fixed bed of catalyst which is disposed in the first reactor. The catalyst which was a conventional iron based dehydrogenation catalyst was of ⅛ inch average size having the following composition: 50% $Fe_2O_3$, 25% $K_2CO_3$, 3% $Cr_2O_3$, the remainder being a binder (Portland cement).

The effluent from the first reactor was withdrawn at a temperature of 584° C. and was introduced to the tube side of the heat exchanger through which 324 lbs./hr. of steam at an inlet temperature of 681° C. were flowing through the shell side. The effluent from the first reactor was thus reheated to 604° C. and was introduced into a second reactor containing the same catalyst as the first reactor. More ethylbenzene was dehydrogenated in the second reactor and the effluent from the second reactor was withdrawn at a temperature of 580° C. This effluent was then subjected to a product recovering system wherefrom styrene was recovered.

The conversion to styrene was 50%. By conversion is meant the ratio (multiplied by one hundred) of moles of ethylbenzene converted to the moles of ethylbenzene fed to the first reactor. The moles of ethylbenzene converted is equal to the moles of ethylbenzene fed to the first reactor minus the moles of ethylbenzene recovered in the final reaction products. Efficiency refers to the ratio (multiplied by one hundred) of moles of styrene in the product to the moles of ethylbenzene converted. Generally, higher conversions to styrene can be obtained at slight sacrifice in efficiency.

What is claimed is:

1. In a process for dehydrogenation of an alkylated aromatic hydrocarbon in the presence of steam which comprises passing a mixture of said hydrocarbon and steam through a plurality of catalytic dehydrogenation reaction zones in series, wherein the effluent from one reaction zone is introduced into the next reaction zone and wherein the temperature of said mixture of hydrocarbon and steam entering the first reaction zone ranges from about 580° C. to about 650° C., the improvement which comprises reheating the effluent from each reaction zone by indirect heat exchange with steam in a heat exchanger constructed of Type 304 stainless steel and using said steam from said heat exchange step for mixing with said hydrocarbon feed.

2. The process of claim 1 wherein the dehydrogenation of said alkylated aromatic hydrocarbon is effected in two reaction zones.

3. The process of claim 1 wherein said alkylated aromatic hydrocarbon is ethylbenzene.

4. The process of claim 3 wherein the number of reaction zones is two.

5. The process of claim 4 wherein from about 12 to about 20 moles of steam is mixed with each mole of ethylbenzene feed to the first reaction zone.

6. In a process for the dehydrogenation of ethylbenzene to styrene which comprises passing a mixture of ethylbenzene and steam at a temperature of from about 600° C. to about 650° C. through two catalytic dehydrogenation reaction zones in series, reheating the effluent from the first reaction zone by indirect heat exchange with steam in a heat exchanger, said steam being introduced in said heat exchanger at a temperature ranging from about 640° C. to about 700° C. and at the rate of from about 12 to 20 moles per mole of ethylbenzene fed to the first reaction zone, introducing the effluent from the first reaction zone to the next reaction zone, the improvement of carrying out the indirect heat exchange between steam and the effluent from the first reaction zone in a heat exchanger constructed of Type 304 stainless steel.

References Cited

UNITED STATES PATENTS

| | | | |
|---|---|---|---|
| 2,671,050 | 3/1954 | Shortsleeve et al. | 196—133 |
| 2,831,907 | 4/1958 | Mayfield et al. | 260—669 |
| 2,851,502 | 9/1958 | Bowman et al. | 260—669 |
| 3,118,006 | 1/1964 | Lovett et al. | 260—669 |

DELBERT E. GANTZ, *Primary Examiner.*

C. R. DAVIS, *Assistant Examiner.*